United States Patent
Sun et al.

(10) Patent No.: US 11,038,602 B1
(45) Date of Patent: Jun. 15, 2021

(54) ON-CHIP JITTER EVALUATION FOR SERDES

(71) Applicant: CREDO TECHNOLOGY GROUP LIMITED, Grand Cayman (KY)

(72) Inventors: Junqing Sun, Fremont, CA (US); Haoli Qian, Fremont, CA (US)

(73) Assignee: CREDO TECHNOLOGY GROUP LIMITED, Grand Cayman (KY)

(*) Notice: Subject to any disclaimer, the term of this patent is extended or adjusted under 35 U.S.C. 154(b) by 0 days.

(21) Appl. No.: 16/782,926

(22) Filed: Feb. 5, 2020

(51) Int. Cl.
*H04B 17/21* (2015.01)
*H04B 17/14* (2015.01)
*H04L 12/28* (2006.01)

(52) U.S. Cl.
CPC ............ *H04B 17/14* (2015.01); *H04B 17/21* (2015.01); *H04L 12/2801* (2013.01)

(58) Field of Classification Search
CPC ....... H04L 7/033; H04L 7/0331; H04L 1/205; H04L 25/03019; H04L 25/03885; H04L 2027/0069; H04L 2027/0071; H04L 7/0087; H03L 7/0807; H03L 7/091; H03L 7/093; H04B 10/40; H04B 17/21
USPC ........ 375/219–222, 232–233, 319, 359, 371, 375/376, 226
See application file for complete search history.

(56) References Cited

U.S. PATENT DOCUMENTS

| | | | |
|---|---|---|---|
| 4,686,488 A | 8/1987 | Attenborough | |
| 4,975,634 A * | 12/1990 | Shohet | G01R 25/00 324/76.77 |
| 5,768,268 A | 6/1998 | Anderson | |
| 5,943,369 A | 8/1999 | Knutson et al. | |
| 6,509,773 B2 | 1/2003 | Buchwald et al. | |
| 6,654,432 B1 | 11/2003 | O'Shea et al. | |
| 6,678,842 B1 | 1/2004 | Shaffer et al. | |
| 7,049,937 B1 | 5/2006 | Zweig et al. | |
| 7,058,150 B2 | 6/2006 | Buchwald et al. | |
| 7,151,430 B2 | 12/2006 | Mattsson | |
| 7,295,644 B1 | 11/2007 | Wu et al. | |

(Continued)

FOREIGN PATENT DOCUMENTS

| CN | 1941649 A | 4/2007 |
|---|---|---|
| CN | 109075992 A | 12/2018 |

OTHER PUBLICATIONS

Rumer, B. "Fighting Jitter in Fibre-Channel Designs." Electronic Engineering Times, (Feb. 1, 2001). Retrieved Aug. 13, 2019, from https://www.eetimes.com/document.asp?doc_id=1277249.

(Continued)

*Primary Examiner* — Emmanuel Bayard
(74) *Attorney, Agent, or Firm* — Ramey & Schwaller LLP; Daniel J. Krueger

(57) ABSTRACT

An illustrative integrated circuit and method providing on-chip jitter evaluation. One illustrative integrated circuit embodiment includes a digital receiver having a timing recovery circuit that determines a phase offset signal from estimated timing errors of previous sampling instants; and an on-chip memory that captures the phase offset signal, the on-chip memory being coupled to a processor that derives one or more jitter measurements from the phase offset signal. For initial calibration, the processor may configure the receiver for loop back operation, and thereafter the calibration values may enable evaluation of remote transmitter clock jitter.

20 Claims, 5 Drawing Sheets

(56) References Cited

U.S. PATENT DOCUMENTS

| | | | |
|---|---|---|---|
| 7,362,800 B1* | 4/2008 | Zerbe | H04B 17/0085 |
| | | | 375/226 |
| 7,363,563 B1 | 4/2008 | Hissen et al. | |
| 7,401,985 B2 | 7/2008 | Aronson et al. | |
| 7,777,576 B2 | 8/2010 | Waheed et al. | |
| 7,786,913 B2 | 8/2010 | Waheed et al. | |
| 7,920,081 B2 | 4/2011 | Waheed et al. | |
| 8,045,670 B2 | 10/2011 | Waheed et al. | |
| 8,050,373 B2 | 11/2011 | Buchwald et al. | |
| 8,050,375 B2 | 11/2011 | Staszewski et al. | |
| 8,183,971 B2 | 5/2012 | Le Guillou et al. | |
| 8,351,560 B2 | 1/2013 | Buchwald et al. | |
| 8,686,776 B2 | 4/2014 | Lim et al. | |
| 8,841,983 B2 | 9/2014 | Newton et al. | |
| 8,917,124 B1 | 12/2014 | Waltari et al. | |
| 9,177,709 B2 | 11/2015 | Parthasarathy et al. | |
| 9,184,909 B1* | 11/2015 | McCracken | H04L 7/002 |
| 9,230,416 B2 | 1/2016 | Ward et al. | |
| 9,322,704 B1 | 4/2016 | Neveux | |
| 9,385,859 B2 | 7/2016 | Kuan et al. | |
| 9,432,176 B2 | 8/2016 | Yu et al. | |
| 9,667,407 B1 | 5/2017 | Liu et al. | |
| 9,800,438 B1 | 10/2017 | Zhang et al. | |
| 9,906,358 B1 | 2/2018 | Tajalli | |
| 9,935,664 B1 | 4/2018 | Dai et al. | |
| 9,935,800 B1 | 4/2018 | He | |
| 9,941,623 B2 | 4/2018 | Lett | |
| 10,084,623 B1 | 9/2018 | Mactaggart et al. | |
| 10,211,994 B2 | 2/2019 | Lin et al. | |
| 10,305,495 B2 | 5/2019 | Behel et al. | |
| 10,313,105 B2 | 6/2019 | Gao et al. | |
| 10,313,165 B2 | 6/2019 | Cheng et al. | |
| 10,389,515 B1 | 8/2019 | Chien et al. | |
| 10,447,461 B2 | 10/2019 | Barrenscheen | |
| 10,447,509 B1 | 10/2019 | Fang et al. | |
| 10,483,910 B2 | 11/2019 | Gao | |
| 10,665,254 B1* | 5/2020 | Mader | G11B 20/10222 |
| 10,727,786 B2 | 7/2020 | Gao | |
| 2001/0055331 A1* | 12/2001 | Agazzi | H04B 3/235 |
| | | | 375/216 |
| 2002/0039394 A1 | 4/2002 | Buchwald et al. | |
| 2002/0122503 A1* | 9/2002 | Agazzi | H04L 25/03057 |
| | | | 375/316 |
| 2003/0048562 A1* | 3/2003 | Heydari | G11B 5/59633 |
| | | | 360/51 |
| 2003/0137765 A1* | 7/2003 | Yamazaki | G11B 5/09 |
| | | | 360/39 |
| 2004/0160530 A1* | 8/2004 | Suzuki | H03L 7/00 |
| | | | 348/536 |
| 2004/0213337 A1 | 10/2004 | Li et al. | |
| 2005/0169417 A1* | 8/2005 | Amirichimeh | H03M 9/00 |
| | | | 375/371 |
| 2005/0207520 A1 | 9/2005 | Su et al. | |
| 2005/0238126 A1 | 10/2005 | Ribo et al. | |
| 2007/0217559 A1* | 9/2007 | Stott | G11C 7/1051 |
| | | | 375/355 |
| 2007/0246805 A1 | 10/2007 | Zhang et al. | |
| 2007/0280341 A1 | 12/2007 | Hidaka | |
| 2007/0280342 A1 | 12/2007 | Hidaka | |
| 2007/0280383 A1 | 12/2007 | Hidaka | |
| 2007/0280384 A1 | 12/2007 | Hidaka | |
| 2007/0280389 A1 | 12/2007 | Hidaka | |
| 2007/0280390 A1 | 12/2007 | Hidaka | |
| 2007/0280391 A1 | 12/2007 | Hidaka | |
| 2007/0297209 A1 | 12/2007 | Hidaka | |
| 2007/0297248 A1 | 12/2007 | Hidaka | |
| 2007/0300119 A1 | 12/2007 | Hidaka | |
| 2008/0056344 A1 | 3/2008 | Hidaka | |
| 2008/0072130 A1* | 3/2008 | Stimple | H04L 7/08 |
| | | | 714/798 |
| 2008/0172193 A1* | 7/2008 | Rhee | G01R 31/31709 |
| | | | 702/69 |
| 2008/0191746 A1* | 8/2008 | Friedman | H03L 7/087 |
| | | | 327/5 |
| 2008/0315928 A1 | 12/2008 | Waheed et al. | |
| 2008/0315960 A1 | 12/2008 | Waheed et al. | |
| 2008/0317187 A1 | 12/2008 | Waheed et al. | |
| 2008/0317188 A1 | 12/2008 | Staszewski et al. | |
| 2010/0283654 A1 | 11/2010 | Waheed et al. | |
| 2010/0310030 A1* | 12/2010 | Bhagavatheeswaran | |
| | | | H03L 7/0805 |
| | | | 375/375 |
| 2011/0148676 A1 | 6/2011 | Waheed et al. | |
| 2012/0025918 A1* | 2/2012 | Wang | H03L 7/0996 |
| | | | 331/25 |
| 2012/0044034 A1 | 2/2012 | Nazarian et al. | |
| 2013/0014995 A1 | 1/2013 | Scott et al. | |
| 2013/0294490 A1* | 11/2013 | Chandrasekaran | H04L 1/205 |
| | | | 375/226 |
| 2013/0343400 A1 | 12/2013 | Lusted et al. | |
| 2014/0086264 A1 | 3/2014 | Lusted et al. | |
| 2014/0126613 A1* | 5/2014 | Zhang | H04L 7/033 |
| | | | 375/219 |
| 2014/1468333 | 5/2014 | Lusted et al. | |
| 2015/0003505 A1 | 1/2015 | Lusted et al. | |
| 2015/0063514 A1 | 3/2015 | Akita et al. | |
| 2015/0078495 A1 | 3/2015 | Hossain et al. | |
| 2016/0013929 A1 | 1/2016 | Takanashi et al. | |
| 2016/0337114 A1 | 11/2016 | Baden et al. | |
| 2017/0310456 A1 | 10/2017 | Tajalli | |
| 2018/0083638 A1 | 3/2018 | Tajalli | |
| 2018/0083809 A1 | 3/2018 | Tajalli et al. | |
| 2018/0115410 A1 | 4/2018 | Tajalli et al. | |
| 2018/0138915 A1 | 5/2018 | Jenkins et al. | |
| 2018/0219513 A1 | 8/2018 | Gao | |
| 2018/0343011 A1 | 11/2018 | Tajalli et al. | |
| 2019/0007055 A1 | 1/2019 | Nelson | |
| 2019/0081772 A1 | 3/2019 | Gao et al. | |
| 2019/0198602 A1 | 6/2019 | Liu et al. | |
| 2019/0386851 A1 | 12/2019 | Dai et al. | |
| 2020/0028662 A1 | 1/2020 | Brown et al. | |
| 2020/0044604 A1 | 2/2020 | Gao | |
| 2020/0076439 A1 | 3/2020 | Weeks et al. | |
| 2020/0321967 A1 | 10/2020 | Tajalli et al. | |

OTHER PUBLICATIONS

IEEE P802.3cd/D1.2, Feb. 3, 2017 (Amendment of IEEE Std 802.3-2015 as amended) IEEE Draft Standard for Ethernet Amendment: Media Access Control Parameters for 50 Gb/s, 100 Gb/s and 200 Gb/s Operation. The Institute of Electrical and Electronics Engineers, Inc., 2017; S.I.: IEEE.

International Search Report and Written Opinion dated Dec. 6, 2017 in International Application No. PCT/CN2017/075961.

LAN/MAN Standards Committee of the IEEE Computer Society. "IEEE Standard for Ethernet" IEEE Std 802.3TM-2015, Sep. 3, 2015 (Sep. 3, 2015).

Mueller and Muller, "Timing recovery in digital synchronous data receivers", IEEE Trans. on Comm.,v24n5, pp. 516-531, May 1976.

Jan W.M. Bergmans, "Digital Baseband Transmission and Recording", Philips Research, endhoven, The Netherland.

Mueller, Kurt H., et al., Timing Recovery in Digital Synchronous Data Receivers, IEEE Transactions on Communications, May 1976, 516-531, vol. Com-24, No. 5.

High-Speed Baud-Rate Clock Recovery by Faisal A. Musa, (2008).

Notice of Allowability dated Oct. 23, 2020 in corresponding U.S. Appl. No. 16/874,261.

\* cited by examiner

ON-CHIP JITTER EVALUATION FOR SERDES

BACKGROUND

Digital communications occur between sending and receiving devices over an intermediate communications medium, e.g., a fiberoptic cable or insulated copper wire, having one or more designated communications channels, e.g., carrier wavelengths or frequency bands. Each sending device typically transmits symbols at a fixed symbol rate, while each receiving device detects a potentially corrupted sequence of symbols and attempts to reconstruct the transmitted data.

A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by sequences of two or more symbols. The simplest digital communication links use only one bit per symbol; a binary '0' is represented by one symbol (e.g., an electrical voltage or current signal within a first range), and binary '1' by another symbol (e.g., an electrical voltage or current signal within a second range).

Channel non-idealities produce dispersion which may cause each symbol to perturb its neighboring symbols, causing intersymbol interference (ISO. As the symbol rate increases, ISI can make it difficult for the receiving device to determine which symbols were sent in each interval, particularly when such ISI is combined with additive noise. The open literature discloses many equalization and demodulation techniques for recovering digital data from the degraded receive signal even in the presence of ISI. A critical piece of such techniques is a determination of the correct sample timing, as sample timing directly affects the signal to noise ratio of the discrete samples.

In most cases, the sample timing is recovered from the data stream itself using any one of various available strategies for detecting and tracking optimal sample timing. Such timing recovery strategies must deal not only with the channel dispersion and noise, but also with discrepancies between the clock signals for the transmitter and receiver. In particular, timing jitter can adversely affect the reliability of the communications link, whether measured in terms of error rate, eye size, or signal-to-noise ratio. As such, measurements of timing jitter can serve as early indicators of link reliability, and in particular, may indicate whether a given transmitter or receiver should be recalibrated or replaced to ensure continued link reliability.

SUMMARY

Accordingly, there are disclosed herein an illustrative integrated circuit and method providing on-chip jitter evaluation. One illustrative integrated circuit embodiment includes a digital receiver having a timing recovery circuit that determines a phase offset signal from estimated timing errors of previous sampling instants; and an on-chip memory that captures the phase offset signal, the on-chip memory being coupled to a processor that derives one or more jitter measurements from the phase offset signal.

One illustrative method embodiment includes: (a) operating a digital receiver to convert a communications signal into a digital data stream, the digital receiver including a timing recovery circuit that determines a phase offset signal from estimated timing errors of previous sampling instants; (b) capturing the phase offset signal in an on-chip memory; and (c) using a processor coupled to the on-chip memory to derive one or more jitter measurements from the phase offset signal.

Each of the foregoing embodiments may be implemented individually or in combination, and may be implemented with any one or more of the following features in any suitable combination: 1. the one or more jitter measurements include at least one of: a probability distribution, a mean-square value, a root-mean-square value, and a frequency transform. 2. the on-chip memory captures the phase offset signal during communications from a remote transmitter, such that the measurements represent a link jitter. 3. the processor reports an error condition if the one or more jitter measurements indicate an inadequate link quality. 4. the processor periodically reports link quality to a switch management fabric. 5. the integrated circuit includes: a local transmitter that sends a communication signal; and a loop-back path that selectably couples the communication signal to the digital receiver, such that the measurements represent a loopback jitter. 6. the local transmitter and the digital receiver are configurable to use a shared reference clock and configurable to use separate reference clocks. 7. the processor combines the digital receiver jitter with a link jitter to report a jitter for a remote transmitter. 8. the integrated circuit is embodied in a network cable. 9. the integrated circuit is embodied in a network switch or router.

DETAILED DESCRIPTION

Figure 1:
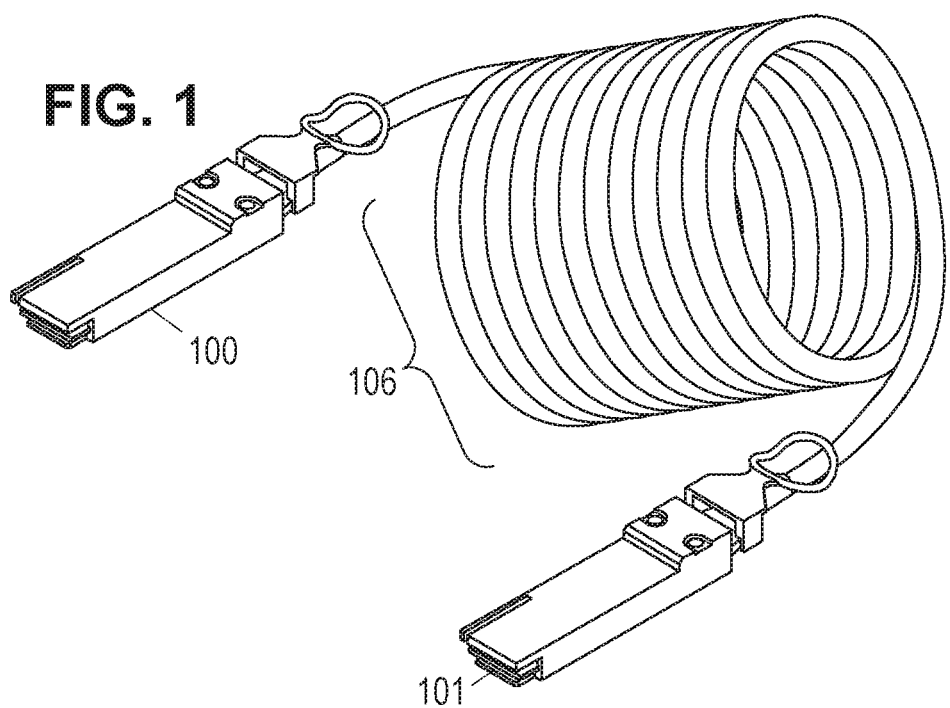
FIG. 1 is a perspective view of an illustrative active Ethernet cable (AEC).

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

Disclosed herein are circuits and methods for evaluating timing jitter. These circuits and methods can be embedded on-chip with integrated circuit transceivers to characterize the timing jitter of not only the transceivers, but also of any remote transmitters with which the local receiver is linked. The measured jitter can be reported to, e.g., a switch management fabric, that monitors the performance of the transceivers and the reliability of the communication links. The jitter measurements can also, or alternatively, be compared to predetermined performance thresholds and, if the jitter is determined to be excessive or otherwise unsatisfactory, an alert signal may be asserted or an alert message may be sent to warn of potentially inadequate link reliability and/or to initiate corrective action by a user or technician.

As one specific example, a switch port, upon detecting that a linked transmitter exhibits excessive timing jitter, may cause a switch controller to turn on a warning light near the port and to transmit an alert message to a central service that monitors all the switches in a given facility. As another specific example, an active network cable may have connectors that, when plugged into a switch port, perform a timing jitter evaluation of their embedded transceivers and the port transmitters to which they are connected. A status LED on each connector may be illuminated as green to indicate that no faults have been detected (including no detection of excessive timing jitter). On the other hand, if a connector detects excessive timing jitter, the status LED on that connector may be illuminated as yellow to warn that the link is unreliable.

As a prelude to a more detailed discussion of the on-chip timing jitter evaluation, we begin with a physical implementation to provide some context. FIG. 1 is a perspective view of an illustrative cable that may be used to provide a high-bandwidth communications link between devices in a routing network. The routing network may be or include, for example, the Internet, a wide area network, a storage area network, or a local area network. The linked devices may be computers, switches, routers, and the like. The cable includes a first connector 100 and a second connector 101 that are electrically connected via electrical conductors 106 in a cord. The electrical conductors 106 may be electrically conductive wires arranged in a paired form such as with twinaxial conductors. Twinaxial conductors can be likened to coaxial conductors, but with two inner conductors instead of one. The inner conductors may be driven with a differential signal and their shared shield operates to reduce crosstalk with other twinaxial conductors in the cable. Depending on the performance criteria, it may be possible to employ other paired or single-ended conductor implementations.

Pursuant to the Ethernet standard, each conductor pair may provide unidirectional transport of a differential signal. To enable robust performance over even extended cable lengths, each connector 100, 101 may include a powered transceiver that performs clock and data recovery (CDR) and re-modulation of data streams, hereafter called a data recovery and re-modulation (DRR) device. The DRR devices process data streams traveling in each direction. Notably, the transceivers perform CDR and re-modulation not only of the inbound data streams to the host interface as they exit the cable, but also of the outbound data streams from the host interface entering the cable.

It is acknowledged here that the outbound data streams may be expected to be compliant with the relevant standard (e.g., the Ethernet standard for 400 Gbps) and may be expected to have experienced essentially no deterioration from their traversal of the network interface port's receptacle pins and the cable assembly's connector plug pins. Nevertheless, the modulation quality and equalization strategy employed by the electronics manufacturer of the transmitting network interface is generally unknown and the minimum requirements of the standard may be inadequate for transport over an extended cable length, particularly if the electronics manufacturer of the receiving network interface is different than that of the transmitting network interface. As with the transmitting network interface, the equalization and demodulation strategy employed by the electronics manufacturer of the receiving network interface is generally unknown and may be unable to cope with the attenuation and interference caused by signal transport over an extended cable length, particularly if the connectors aren't fully seated or if the contacts have tarnished. By performing DRR of both inbound and outbound data streams, the illustrative cable ensures that the electrical signals transiting the cable conductors are able to withstand the attenuation and interference encountered between the cable's end connectors, thereby enabling consistently robust data transfer over extended cable lengths to be assured without consideration of these factors.

Figure 2:
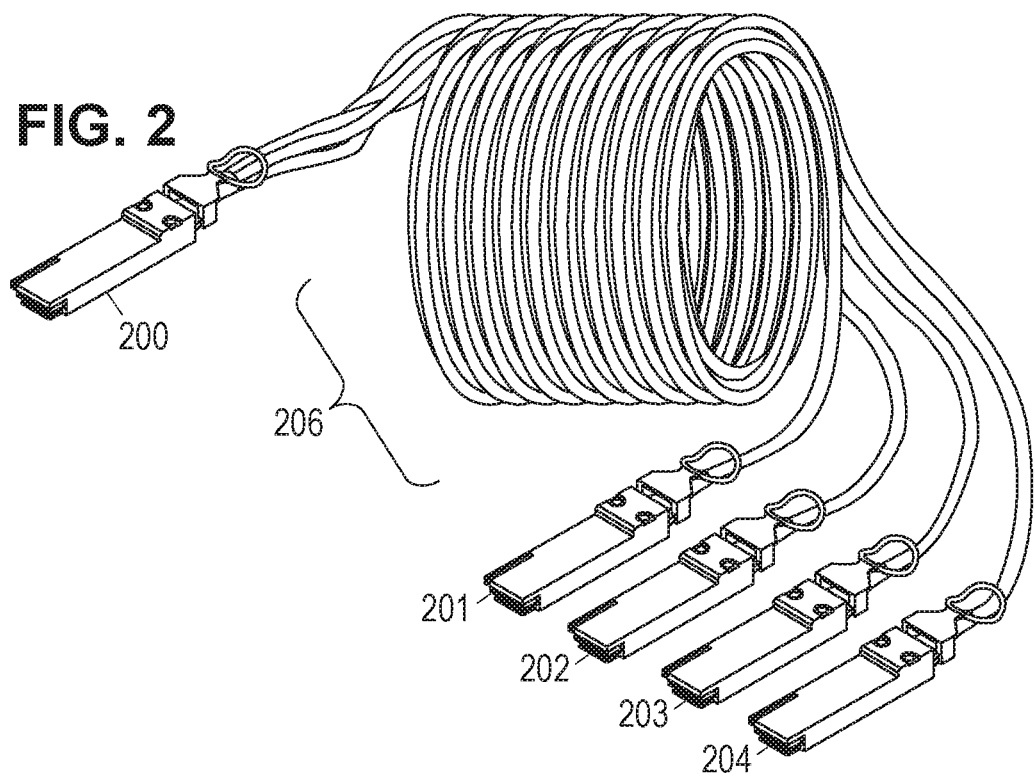
FIG. 2 is a perspective view of an illustrative 1:4 breakout AEC.

Though a 1:1 cable has been used in the foregoing description, the principles disclosed hereinbelow are also applicable to format conversion cables and to breakout cable designs. FIG. 2 is a perspective view of an illustrative 1:4 breakout cable having a unary end connector 200 which may be designed for sending and receiving a 200 Gbps Ethernet data stream, e.g., in the form of 4 lanes of 50 Gbps, each lane using PAM4 at 26.5625 GBd. Electrical conductors 206 are encased as four cords each carrying 1 lane of PAM4 at 26.5625 GBd (50 Gbps) or 2 lanes of non-return to zero (NRZ) signaling at 26.5625 GBd (25 Gbps) to a corresponding one of the split-end connectors 201-204. Each of the split-end connectors 201-204 may be designed for sending and receiving a 50 Gbps Ethernet data stream. Such breakout cables are useful for linking host devices designed to different generations of the Ethernet standard. As another example, the unary end connector may be designed for sending and receiving 400 Gbps (8 lanes of 50 Gbps PAM4), while each of the split-end connectors may be designed for sending and receiving 100 Gbps (4 lanes of 25 Gbps NRZ). At either the unary end or at the split ends, the DRR devices may provide format conversion by, e.g., converting 1 lane of PAM4 symbols into 2 lanes of NRZ symbols, and vice versa.

Figure 3:
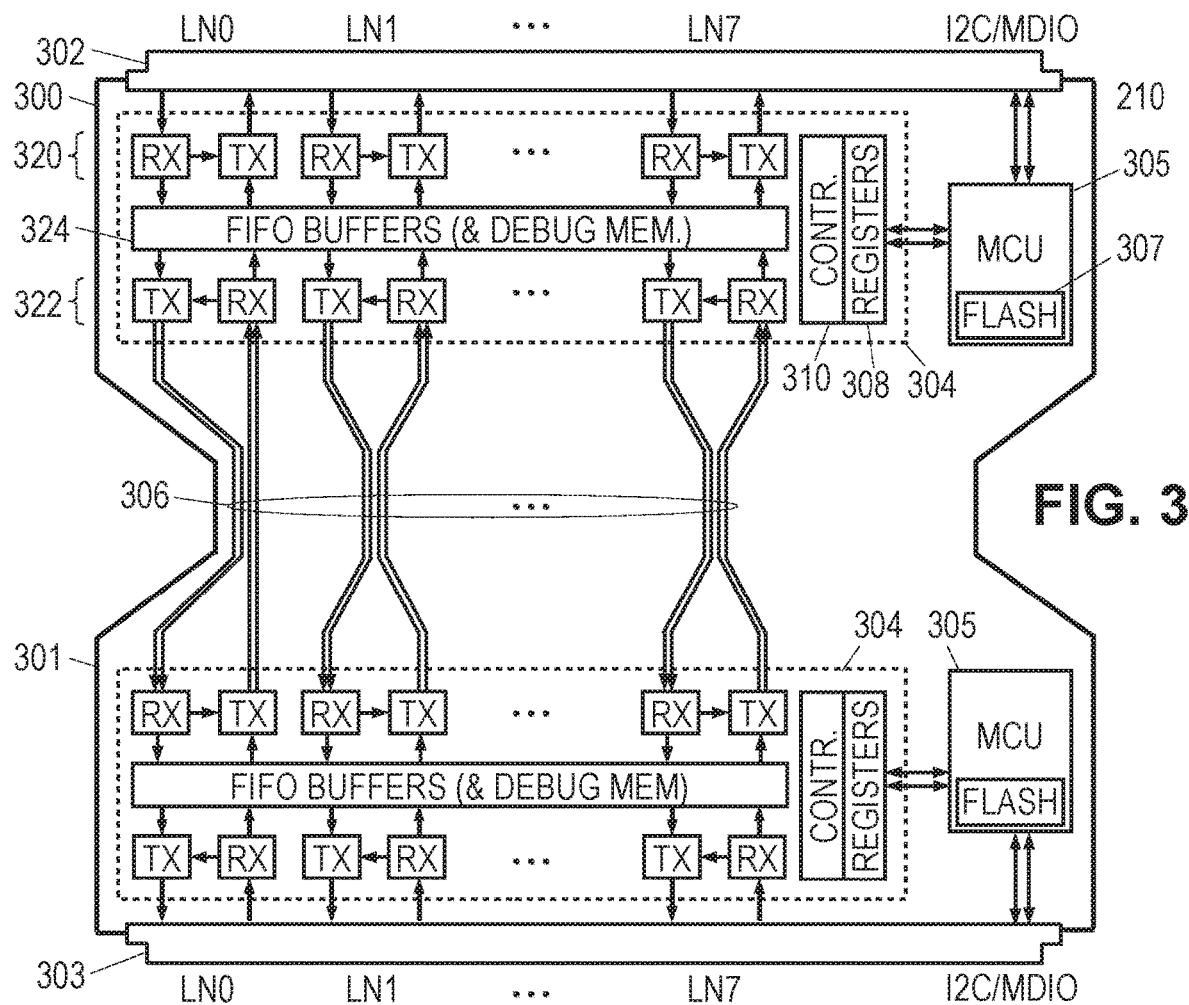
FIG. 3 is a function-block diagram of the illustrative AEC.

FIG. 3 is a function-block diagram of the illustrative cable of FIG. 1. Connector 300 includes a plug 302 adapted to fit a standard-compliant Ethernet port in a first host device 500 (FIG. 5) to receive an electrical input signal carrying an outbound data stream from the host device and to provide an electrical output signal carrying an inbound data stream to the host device. Similarly, connector 301 includes a plug 303 that fits an Ethernet port of a second host device 501. Connector 300 includes a first DRR device 304 to perform CDR and re-modulation of the data streams entering and exiting the cable at connector 300, and connector 301 includes a second DRR device 304 to perform CDR and re-modulation of the data streams entering and exiting the cable at connector 301. The DRR devices 304 may be integrated circuits mounted on a printed circuit board and connected to connector plug pins via circuit board traces. The wires of cord 306 may be soldered to corresponding pads on the printed circuit board that electrically connect to the DRR devices.

In at least some contemplated embodiments, the printed circuit boards each also support a micro-controller unit (MCU) 305. Each DRR device 304 is coupled to a respective MCU device 305 which configures the operation of the DRR device via a first two-wire bus. At power-on, the MCU device 305 loads equalization parameters from Flash memory 307 into the DRR device's configuration registers 308. The host device can access the MCU device 305 via a second two-wire bus that operates in accordance with the I2C bus protocol and/or the faster MDIO protocol. With this access to the MCU device 305, the host device can adjust the cable's operating parameters and monitor the cable's performance as discussed further below.

Each DRR device 304, includes a set 320 of transmitters and receivers for communicating with the host device and a set 322 of transmitters and receivers for sending and receiving via conductor pairs running the length of the cable. The illustrated cable supports eight bidirectional communication lanes LN0-LN7, each bidirectional lane formed by two unidirectional connections, each unidirectional connection having a differentially-driven twinaxial conductor pair (with a shield conductor not shown here). The transceivers include a memory 324 to provide first-in first-out (FIFO) buffering between the transmitter & receiver sets 320, 322. An embedded controller 310 coordinates the operation of the transmitters and receivers by, e.g., setting initial equalization parameters and ensuring the training phase is complete across all lanes and links before enabling the transmitters and receiver to enter the data transfer phase, during which the controller may coordinate measurements of link jitter. On power-up, or when a test mode is invoked, the controller 310 may further place the transmitter-receiver pairs into a loop back configuration as described below to measure local transmitter and receiver timing jitter. The embedded controller 310 employs the set of registers 308 to receive commands and parameter values, and to provide responses potentially including status information and performance data such as timing jitter.

Figure 4:
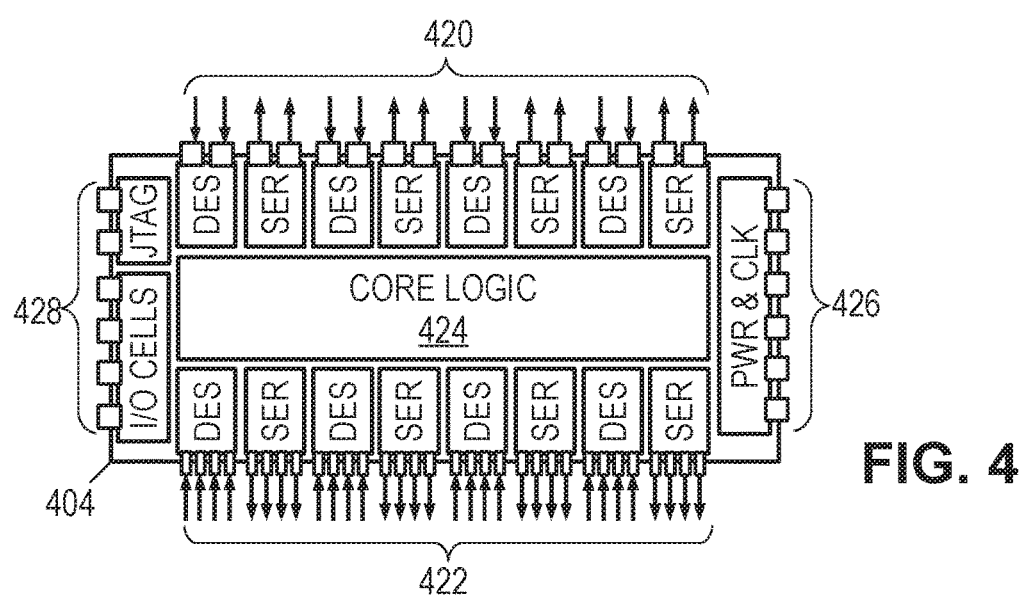
FIG. 4 is a block diagram of an illustrative multi-lane data recovery and remodulation (DRR) device.

FIG. 4 is a block diagram of an illustrative monolithic transceiver chip 404 which may embody the DRR devices 304 of FIG. 3. Chip 404 includes SerDes modules with contacts 422 for receiving and transmitting high-rate serial bitstreams across eight (differential) lanes in each direction, host-interfacing SerDes modules with contacts 420 for exchanging high-rate digital data streams with the host, and core logic 424 for implementing a channel communications protocol while buffering data in each direction. Also included are various supporting modules accessible via contacts 426, 428, for functions such as power regulation and distribution, clock generation, digital input/output lines for control, and a JTAG module for built-in self testing. The chip designer can design the device by placing the predefined modular units for the serializers, deserializers, power, clock generator, I/O cells, and JTAG; and routing the interconnections between the modular units with a small amount of supporting logic.

Figure 5:
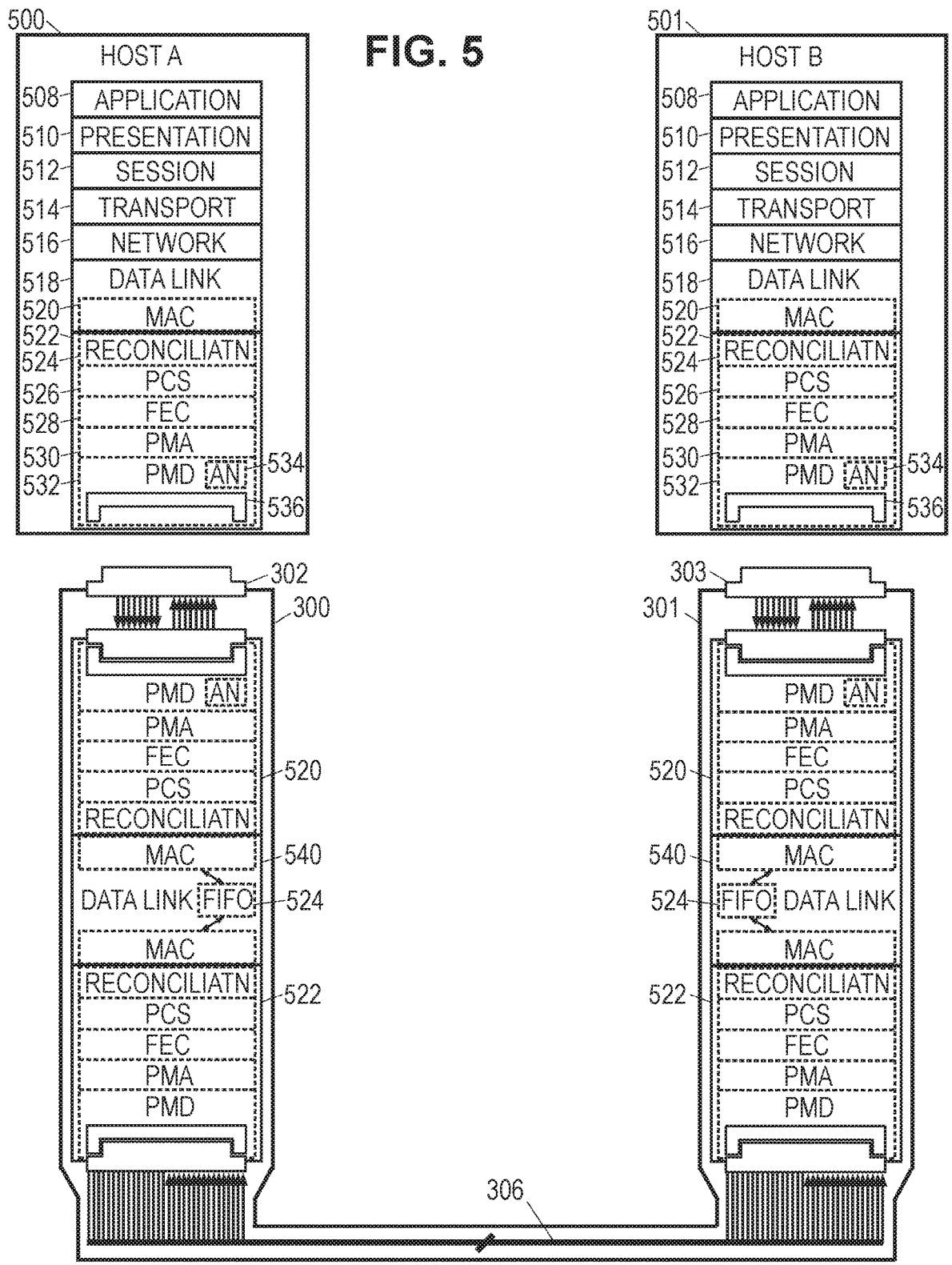
FIG. 5 is an architectural diagram for an illustrative communications link.

The illustrative cable of FIG. 3 may be a part of a point-to-point communications link between two host devices 500, 501 as shown in the architectural diagram of FIG. 5. FIG. 5 shows the architecture using the ISO/IEC Model for Open Systems Interconnection (See ISO/IEC 7498-1:1994.1) for communications over a physical medium such as the twinaxial conductor pairs 306. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers may be implemented as application-specific hardware.

The Application Layer 508 is the uppermost layer in the model, and it represents the user applications or other software operating on different systems that need a facility for communicating messages or data. The Presentation Layer 510 provides such applications with a set of application programming interfaces (APIs) that provide formal syntax along with services for data transformations (e.g., compression), establishing communication sessions, connectionless communication mode, and negotiation to enable the application software to identify the available service options and select therefrom. The Session Layer 512 provides services for coordinating data exchange including: session synchronization, token management, full- or half-duplex mode implementation, and establishing, managing, and releasing a session connection. In connectionless mode, the Session Layer may merely map between session addresses and transport addresses.

The Transport Layer 514 provides services for multiplexing, end-to-end sequence control, error detection, segmenting, blocking, concatenation, flow control on individual connections (including suspend/resume), and implementing end-to-end service quality specifications. The focus of the Transport Layer 514 is end-to-end performance/behavior. The Network Layer 516 provides a routing service, determining the links used to make the end-to-end connection and when necessary acting as a relay service to couple together such links. The Data link layer 518 serves as the interface to physical connections, providing delimiting, synchronization, sequence and flow control across the physical connection. It may also detect and optionally correct errors that occur across the physical connection. The Physical layer 522 provides the mechanical, electrical, functional, and procedural means to activate, maintain, and deactivate channels (representations of conductor pairs 306), and to use the channels for transmission of bits across the physical media.

The Data Link Layer 518 and Physical Layer 522 are subdivided and modified slightly by IEEE Std 802.3-2015, which provides a Media Access Control (MAC) Sublayer 520 in the Data Link Layer 518 to define the interface with the Physical Layer 522, including a frame structure and transfer syntax. Within the Physical Layer 522, the standard provides a variety of possible subdivisions such as the one illustrated in FIG. 5, which includes an optional Reconciliation Sublayer 524, a Physical Coding Sublayer (PCS) 526, a Forward Error Correction (FEC) Sublayer 528, a Physical Media Attachment (PMA) Sublayer 530, a Physical Medium Dependent (PMD) Sublayer 532, and an Auto-Negotiation (AN) Sublayer 534.

The optional Reconciliation Sublayer 524 merely maps between interfaces defined for the MAC Sublayer 520 and the PCS Sublayer 526. The PCS Sublayer 526 provides scrambling/descrambling, data encoding/decoding (with a transmission code that enables clock recovery and bit error detection), block and symbol redistribution, PCS alignment marker insertion/removal, and block-level lane synchronization and deskew. To enable bit error rate estimation by components of the Physical Layer 522, the PCS alignment markers typically include Bit-Interleaved-Parity (BIP) values derived from the preceding bits in the lane up to and including the preceding PCS alignment marker.

The FEC Sublayer 528 provides, e.g., Reed-Solomon coding/decoding that distributes data blocks with controlled redundancy across the lanes to enable error correction. In some embodiments (e.g., in accordance with Article 91 or proposed Article 134 for the IEEE Std 802.3), the FEC Sublayer 528 modifies the number of lanes (Article 91 provides for a 20-to-4 lane conversion).

The PMA Sublayer 530 provides lane remapping, symbol encoding/decoding, framing, and octet/symbol synchronization. The PMD Sublayer 532 specifies the transceiver conversions between transmitted/received channel signals and the corresponding bit (or digital symbol) streams. An optional AN Sublayer 534 is shown as an internal element of the PMD Sublayer 532, and it implements an initial start-up of the communications channels, conducting an auto-negotiation phase and a link-training phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities. A receptacle 536 is also shown as part of the PMD sublayer 532 to represent the physical network interface port.

The connectors 300, 301, have plugs 302, 303 that mate with the receptacles 536 of the two host devices 500, 501. Within each connector, the DRR devices may implement a host-facing Physical Layer 520, a center-facing Physical Layer 522, and a Data Link Layer 540 that bridges together the two Physical Layers. In some embodiments, one or more of the internal sublayers within each connector (e.g., FEC, PCS, Reconciliation, MAC) are bypassed or omitted entirely to reduce areal requirements and/or to reduce power. More information regarding the operation of the sublayers, as well as the electrical and physical specifications of the connections between the nodes and the communications medium (e.g., pin layouts, line impedances, signal voltages & timing), and the electrical and physical specifications for the communications medium itself (e.g., conductor arrangements in copper cable, limitations on attenuation, propagation delay, signal skew), can be found in the current Ethernet standard, and any such details should be considered to be well within the knowledge of those having ordinary skill in the art.

The MAC, Reconciliation, PCS, FEC, PMA, and PMD Sublayers, may be implemented as application-specific integrated circuitry to enable high-rate processing and data transmission. The receiver and transmitter sets 320, 322, may implement the PMA and PMD sublayers.

Figure 6:
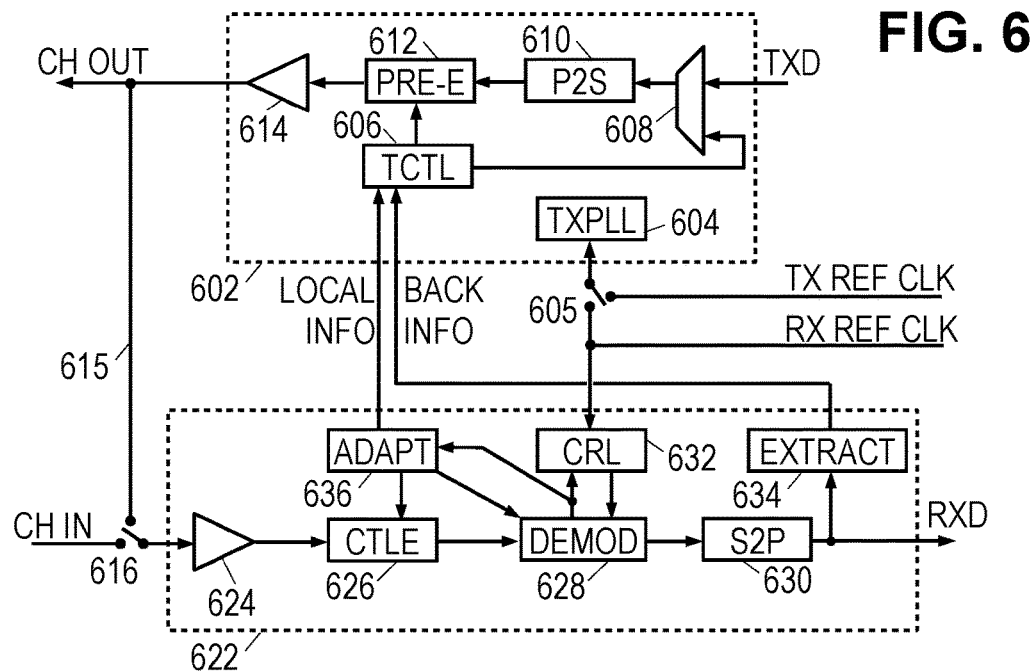
FIG. 6 is a block diagram of an illustrative local transmitter-receiver pair

FIG. 6 is a block diagram of an illustrative local transmitter-receiver pair (transceiver) that may be a member of the sets 320, 322. A transmitter 602 receives blocks of channel bits or symbols on the TXD bus for transmission in the form of a CH_OUT signal. Transmitter 602 includes a phase lock loop (TXPLL) 604 that converts a reference clock signal (either TX_REF_CLK or RX_REF_CLK as selected by switch 605) into a modulation clock that controls the timing of parallel to serial converter (P2S) circuit 610. During normal operations, multiplexer 608 supplies blocks of channel bits or symbols from the TXD bus to the P2S circuit 610. P2S circuit converts the blocks into a digital data stream. A transmit filter 612, also called a pre-equalization filter, converts the digital data stream into an analog electrical signal with spectral shaping to combat channel degradation. Driver 614 amplifies the analog electrical signal to drive the channel output (CH_OUT) node.

During training operations, multiplexer 608 obstructs information from the TXD bus, instead supplying P2S circuit 610 with training frames from a training controller 606. The training controller 606 generates the training frames based on the convergence status and transmit filter coefficient adjustments (LOCAL_INFO) received from the local receiver 622. That is, in addition to training patterns, the training frames may include backchannel information to be used by the remote end of the channel. The training frames include training sequences as specified by the relevant portions of the current Ethernet standard (IEEE Std 802.3).

The training controller 606 further accepts any back-channel information (BACK_INFO) extracted by the local receiver 622 from received training frames sent by the local end node. The training controller applies the corresponding adjustments to the coefficients of transmit filter 612. Upon conclusion of the training phase, multiplexer 608 begins forwarding TXD blocks to the P2S circuit 610.

A loop back path 615 connects the CH_OUT node to a switch 616 that selects between the CH_OUT signal and an analog electrical signal (CH_IN) received from a remote transmitter. The switch 616 supplies the selected signal to an optional low noise amplifier (LNA) 624 in receiver 622. If included, the LNA 624 provides a high input impedance to minimize channel loading and amplifies the received electrical signal to drive the input of a continuous time linear equalization (CTLE) filter 626. CTLE filter 626 provides continuous time filtering to shape the signal spectrum to reduce the length of the channel impulse response while minimizing inter-symbol interference (ISI). A demodulator 628 operates on the filtered signal to detect each transmitted channel bit or symbol, thereby producing a demodulated digital data stream. Some demodulator embodiments employ digital filter equalization and/or decision feedback equalization. A serial to parallel conversion (S2P) circuit 630 groups the digital data stream bits or symbols into blocks for delivery on the receive data (RXD) bus to enable subsequent on-chip operations at lower clock rates.

A clock recovery loop (CRL) circuit 632 extracts a clock signal from the filtered signal and/or the digital data stream and supplies it to the demodulator 628 to control sample and symbol detection timing. While certain contemplated cable embodiments do not support auto-negotiation, other contemplated embodiments do support auto-negotiation in accordance with the Ethernet standard. When supported, the auto-negotiation may be implemented as described in PCT/CN2017/075961, titled "Ethernet link extension method and device" by inventors Yifei Dai, Haoli Qian, and Jeff Twombly, and filed 2017 Mar. 8. A detector or packet information extractor 634 monitors the receive signal for the end of the auto-negotiation phase and/or the beginning of the training phase frames. Whether or not autonegotiation is supported, a training phase may be performed during the manufacturing process to set initial values of the equalization parameters for the completed cable.

During the training phase, a filter adaptation circuit 636 measures an error between the input and output of the demodulator's decision element, employing that error in accordance with well-known techniques from the literature on adaptive filtering to determine adjustments for the coefficients in CTLE filter 626, any filters contained in demodulator 628, and the transmit filter 612 of the local transmitter (during loop back) or the remote transmitter, and further operates to determine whether convergence has been achieved. The adaptation circuit 636 adjusts the coefficient values of local elements 626, 628, and outputs locally-generated information (LOCAL_INFO), which includes the transmit filter coefficient adjustments and the convergence status. Where the system supports the use of a backchannel, the LOCAL_INFO is supplied to the local transmitter 602 that communicates in the reverse direction on the same data lane. The local transmitter communicates the transmit filter adjustments and the convergence status via the backchannel to the source of the CH_IN signal. In that vein, the received signal includes back-channel information from the source of the CH_IN signal. The packet information extractor 634 detects the back-channel information (BACK_INFO) and passes it to the local transmitter 602 for use in adjusting the coefficients of the transmit filter 612. In the absence of a back-channel, the LOCAL_INFO may be communicated via the host-interface to the testing apparatus as discussed further below. Once convergence is achieved, receiver 622 is ready to begin normal operations.

Figure 7:
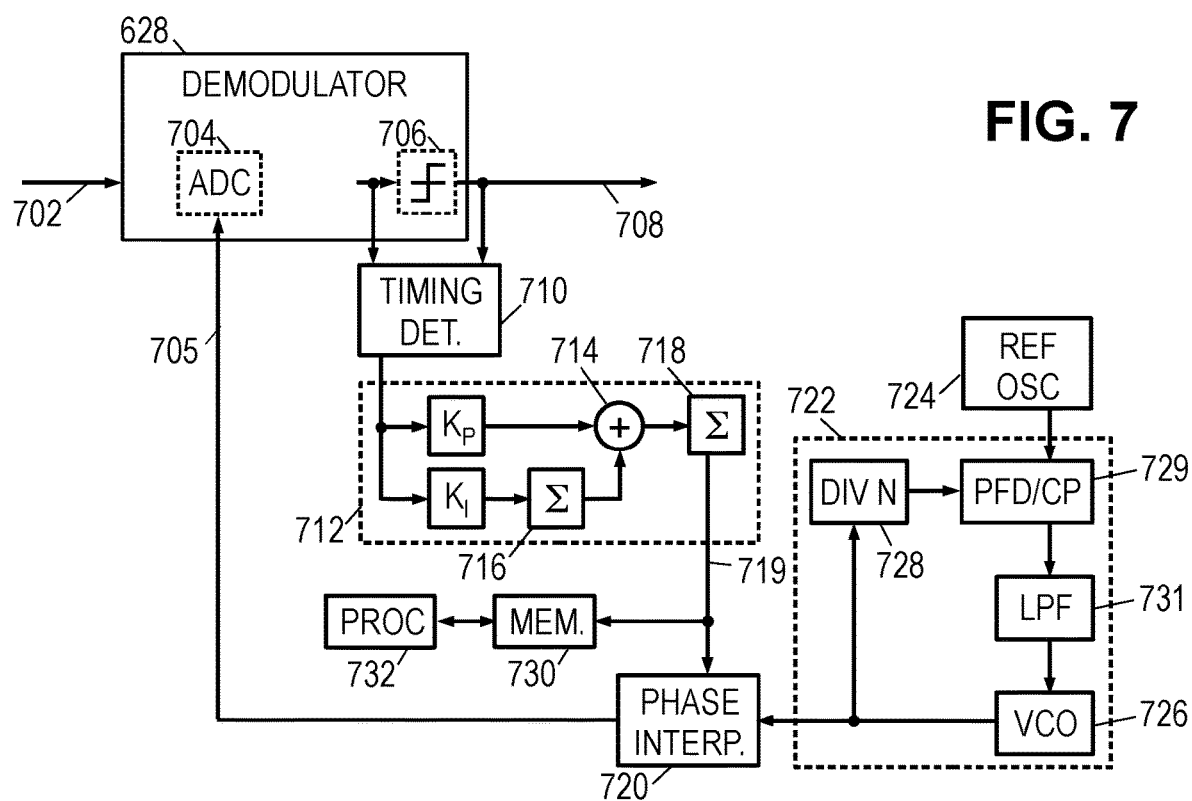
FIG. 7 is a block diagram showing an illustrative clock recovery loop.

FIG. 7 is a block diagram providing more detail for the CRL circuit 632. Various configurations exist for the demodulator 628 that operates to convert the continuous-time filtered signal 702 into a stream of received data 708, but each employs at least an analog to digital converter 704 that samples (or oversamples and interpolates) a signal at sampling instants determined by a sampling clock 705. The demodulator 628 further includes at least one decision element 706 that determines which channel symbol a signal sample most closely represents, usually by comparing the sample to one or more decision thresholds.

While various clock recovery loop implementations are known and described in the open literature, an illustrative implementation is shown in FIG. 7 to aid the reader's understanding. A timing detector 710 derives a timing error estimate from the input and output of the decision element 706. (Principles for designing the timing detector are set forth in Mueller and Muller, "Timing recovery in digital synchronous data receivers", IEEE Trans. on Comm., v24n5, pp. 516-531, May 1976; and certain specific estimators are set forth in U.S. application Ser. No. 16/110,594, "Precompensator-based quantization for clock recovery".) A timing loop filter 712 filters the estimated timing error signal to obtain a phase offset signal 719 for a phase interpolator 720. In the embodiment of FIG. 7, the timing loop filter 712 is a second order proportional-integration (PI) filter having a summer 714, which receives along a first path a proportional (i.e., scaled by a constant coefficient kp) component of the timing error signal, and receives along a second path an integrated (i.e., scaled by a constant coefficient $k_I$ and integrated by integrator 716) component of the timing error signal. The received components are added and provided to a second integrator 718, which integrates the sum to provide the phase offset signal 719 to the phase interpolator 720.

The phase interpolator 720 also receives a clock signal from a phase lock loop (PLL) 722. The phase offset signal 719 causes the phase interpolator 720 to produce the sampling signal 505 by adjusting the phase of the clock signal in a fashion that minimizes an expected value of the timing error. In other words, the phase offset signal compensates for both the frequency offset and phase error of the clock signal relative to the analog data signal, thereby phase-aligning the sampling clock with the data symbols in the analog receive signal.

The clock signal produced by PLL 722 is a frequency-multiplied version of a reference clock signal from reference oscillator 724. A voltage controlled oscillator (VCO) 726 supplies the clock signal to both the phase interpolator 720 and to a counter 728 that divides the frequency of the clock signal by a constant modulus N. The counter supplies the divided-frequency clock signal to a phase-frequency detector (PFD) 729. PFD 729 may use a charge pump (CP) as part of determining which input (i.e., the divided-frequency clock signal or the reference clock signal) has transitions earlier or more often than the other. A low pass filter 731 filters the output of PFD 729 to provide a control voltage to VCO 726. The filter coefficients are chosen so that the divided frequency clock becomes phase aligned with the reference oscillator.

With the foregoing context of an illustrative implementation, we now turn to a method for evaluating clock quality of SerDes devices, and in particular the receiver and the local and remote transmitters to which it may be coupled. To implement the method, the phase offset signal 719 is coupled to a memory buffer 730 to be captured (periodically or on demand) as needed for analysis. A processor 732 (such as controller 310) is coupled to the memory buffer 730 to analyze the phase offset signal as described further below. In other clock recovery loop implementations, other signals containing the compensated phase offset information may be captured and analyzed.

The reference clock 724 has a relatively low frequency, say 500 kHz, which the PLL multiplies to obtain the desired sampling frequency, say 25 GHz, subject to the frequency and phase offset between the transmitter and receiver that the CRL tracks. The CRL has a limited bandwidth, say 4 MHz, to ensure good performance in the presence of channel noise. Within this bandwidth, the phase offset signal may be analyzed to characterize the probability distribution and spectrum of the timing jitter. (Any jitter outside the CRL bandwidth remains uncompensated and would appear in the form of an abysmal error rate.)

If the transmitter and receiver clocks were precisely matched, the phase offset signal 719 would have a constant value. More typically, the phase offset signal will exhibit variation. The processor 732 may analyze the phase offset signal by first performing a linear fit to determine and remove the frequency offset. Note that many techniques are provided in the literature for coping with phase wrap-around when doing linear fitting. For example, a probability distribution for the signal derivative can be determined and the largest mode of the distribution may be taken as the slope of the line. After the slope is determined and removed, the signal mean can be calculated to determine the offset of the line.

Once the linear trend of the phase offset signal has been determined and removed, the processor may then characterize the timing jitter in terms of the residual phase error. Among other things, the processor may calculate a variance, standard deviation (root-mean-square), distribution (histogram), and/or spectrum (discrete Fourier transform) of the residual phase error. While the variance or standard deviation are useful for indicating an overall level of jitter, the distribution and spectrum are useful for diagnosing other potential issues. An approximately Gaussian distribution may indicate normal operation, while a relatively uniform distribution may indicate poor tracking performance. Peaks in the spectrum indicate tones in the phase error, potentially indicating crosstalk between communication signals or between oscillators.

If the transmitter and receiver are using a shared clock, the jitter measurement represents only the sum of the powers of the phase error introduced by the PLLs (TXPLL 604 and RXPLL 722) and the CRL 632. If the transmitter and receiver are using independent clocks, the jitter measurement is the power-sum of the phase error introduced by the PLLs, the CRL, the transmitter clock, and the receiver clock. For the loopback measurement, the transmitter and receiver clock jitters are typically very similar (i.e., TXPLL jitter equals the RXPLL jitter, and the TX clock jitter equals the RX clock jitter). If additional accuracy is needed, the TX clock and PLL jitter can usually be directly measured, e.g., using an oscilloscope while the transmitter generates a training pattern of alternating symbols. Such oscilloscope measurements of the CH_OUT signal jitter may be made at the factory and stored in memory for use with separate clock loopback jitter measurements. Reference clock jitter can similarly be determined and subtracted from the CH_OUT signal jitter to estimate the TXPLL jitter, another value which can be stored in memory for use with shared clock loopback jitter measurements as detailed below.

Figure 8:
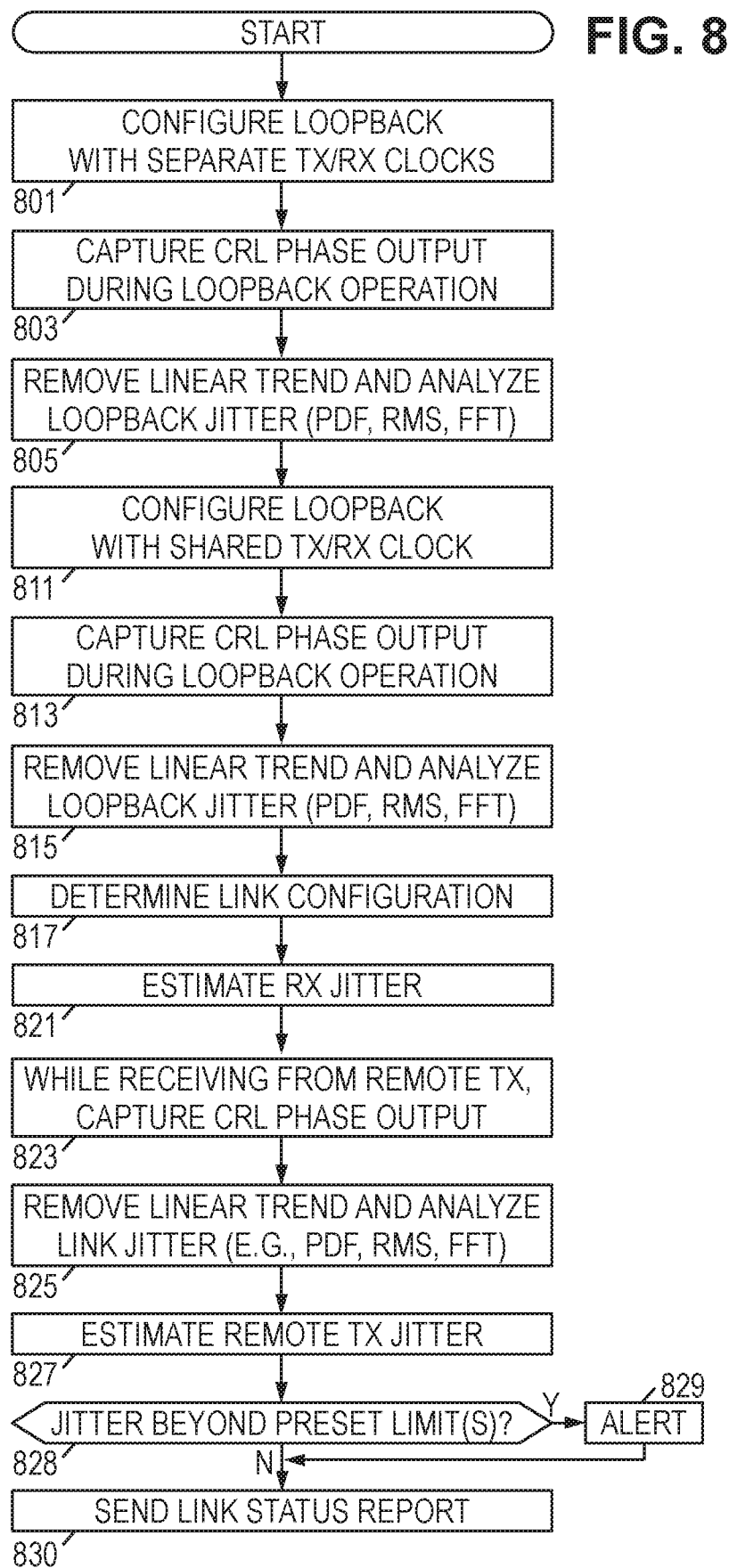
FIG. 8 is a flow diagram of an illustrative method of on-chip jitter evaluation.

With these observations in mind, FIG. 8 shows a flowchart of an illustrative jitter evaluation method that may be implemented by controller 310. In block 801, the controller configures the transceivers for loopback operation (e.g., setting switch 616 to select loopback path 615) using separate clocks (e.g., setting switch 605 to select TX_REF_CLK). In block 803, memory 730 (324) captures the phase offset signals during reception of a transmitted CH_OUT signal. In block 805, the controller analyzes the captured data to remove the linear trend and to characterize the residual phase error, determining a probability distribution, a standard deviation, and a spectrum.

In block 811, the controller configures the transceivers for loopback operation (e.g., setting switch 616 to select loopback path 615) using a shared clock (e.g., setting switch 605 to select RX_REF_CLK). In block 813, memory 730 (324) captures the phase offset signals during reception of a transmitted CH_OUT signal. In block 815, the controller analyzes the captured data to remove the linear trend and to characterize the residual phase error.

In block 817, the controller configures the transceiver for normal operation (e.g., setting switch 616 to select CH_IN) and determines whether the remote transmitter is using a shared reference clock (e.g., if it is part of the same switch) or an independent reference clock.

In block 821, the controller estimates the RX jitter using either the separate clock loopback jitter measurements (if the remote transmitter is using a separate reference clock from the receiver) or the shared clock loopback jitter measurements (if the remote transmitter is using a shared reference clock). Respectively, the CH_OUT jitter measurement or TXPLL jitter measurement value from memory, is subtracted from the separate or shared clock loopback jitter measurement to estimate the RX jitter. Alternatively, the field tester collects the CH_OUT or TXPLL jitter measurements for use in estimating RX jitter. This completes the calibration phase of the process, though it may be periodically repeated.

In block 823, memory 730 (324) captures the phase offset signals during reception of a CH_IN signal. In block 825, the controller analyzes the captured data to remove the linear trend and to characterize the residual phase error, determining a probability distribution, a standard deviation, and a spectrum. These measurements represent the total link jitter.

In block 827, the controller estimates the clock jitter of the remote transmitter. In one embodiment, the controller subtracts the RX jitter from the link jitter measurements of block 825 to estimate the remote TX jitter.

In block 828, the controller evaluates the remote TX jitter relative to preset limits. For example, the variance may be compared to a given limit, or the amplitude of any spectrum peaks may be compared to a preset threshold. If the limits are exceeded, the controller may set an alert signal in block 829. The alert signal may be setting a bit in an error register, illuminating a LED on the enclosure, the transmission of a message to a management fabric of a switch or to a central control service for a facility, or otherwise signaling a user or technician that further investigation is needed to ensure a reliable connection. In block 830, the controller reports the jitter measurements (during product testing) to the test equipment or (in the field) to a switch port, an internal switch controller, or a designated monitoring service Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. An integrated circuit comprising:
    a digital receiver having a timing recovery circuit that determines a phase offset signal from estimated timing errors of previous sampling instants; and
    an on-chip memory that captures multiple samples of the phase offset signal for analysis, the on-chip memory being coupled to a processor that derives one or more jitter measurements from the multiple samples of the phase offset signal.

2. The integrated circuit of claim 1, wherein the one or more jitter measurements include at least one of: a probability distribution, a mean-square value, a root-mean-square value, and a frequency transform.

3. The integrated circuit of claim 1, wherein the on-chip memory captures the multiple samples of the phase offset signal during communications from a remote transmitter, wherein the one or more jitter measurements represent a link jitter, and wherein the processor reports an error condition if the one or more jitter measurements indicate an inadequate link quality.

4. The integrated circuit of claim 3, wherein the processor periodically reports link quality to a switch management fabric.

5. The integrated circuit of claim 1, further comprising:
    a local transmitter that sends a communication signal; and
    a loopback path that selectably couples the communication signal to the digital receiver,
    wherein the multiple samples of the phase offset signal are captured while the loopback path is coupling the digital communication signal to the digital receiver to obtain one or more jitter measurements representing a loopback jitter.

6. The integrated circuit of claim 5, wherein the local transmitter and the digital receiver are configurable to use a shared reference clock and configurable to use separate reference clocks.

7. The integrated circuit of claim 6, wherein the processor determines loopback jitter with a shared reference clock and loopback jitter with separate reference clocks.

8. The integrated circuit of claim 6, wherein the processor combines the loopback jitter with a link jitter to report a jitter for a remote transmitter.

9. The integrated circuit of claim 1, embodied in a network cable.

10. The integrated circuit of claim 1, embodied in a network switch or router.

11. An on-chip jitter evaluation method that comprises:
    operating a digital receiver to convert a communications signal into a digital data stream, the digital receiver including a timing recovery circuit that determines a phase offset signal from estimated timing errors of previous sampling instants;
    capturing the phase offset signal in an on-chip memory for analysis; and
    using a processor coupled to the on-chip memory to derive one or more jitter measurements from the phase offset signal.

12. The method of claim 11, wherein the one or more jitter measurements include at least one of: a probability distribution, a mean-square value, a root-mean-square value, and a frequency transform.

13. The method of claim 11, wherein said capturing the phase offset signal is performed while operating the digital receiver to convert a communications signal from a remote transmitter, and wherein the method further comprises:
    deriving one or more jitter measurements representing a link jitter; and
    reporting the link jitter to a switch management fabric.

14. The method of claim 13, further comprising:
before said capturing, configuring a local transmitter to send a communications signal via a loopback path to the digital receiver to obtain one or more jitter measurements representing a separate clock loopback jitter, wherein said deriving is based at least in part on the separate clock loopback jitter.

15. The method of claim 13, wherein the digital receiver and the remote transmitter use a shared reference clock.

16. The method of claim 15, further comprising:
before said capturing, configuring a local transmitter to send a communications signal via a loopback path to the digital receiver to obtain one or more jitter measurements representing a shared clock loopback jitter, wherein said deriving is based at least in part on the shared clock loopback jitter.

17. An integrated circuit manufacturing method comprising:
providing a digital receiver with a timing recovery circuit that determines a phase offset signal from estimated timing errors of previous sampling instants; and
configuring an on-chip memory to capture multiple samples of the phase offset signal, the on-chip memory being coupled to a processor that derives one or more jitter measurements from the multiple samples of the phase offset signal.

18. The method of claim 17, further comprising:
providing a local transmitter that sends a communication signal; and
providing a loopback path that selectably couples the communication signal to the digital receiver,
wherein the memory is configurable to capture the multiple samples of the phase offset signal while the loopback path is coupling the digital communication signal to the digital receiver to obtain one or more jitter measurements representing a loopback jitter.

19. The method of claim 18, wherein the local transmitter and the digital receiver are configurable to use a shared reference clock and configurable to use separate reference clocks.

20. The method of claim 19, wherein the processor determines loopback jitter with a shared reference clock and loopback jitter with separate reference clocks.

\* \* \* \* \*